United States Patent
Brume et al.

(10) Patent No.: US 8,250,299 B2
(45) Date of Patent: Aug. 21, 2012

(54) MULTI-HOST CONCURRENT WRITING TO MAGNETIC TAPE

(75) Inventors: Shawn O. Brume, Tucson, AZ (US); Fahnmusa C. Jangaba, Tucson, AZ (US); Christine R. Knibloe, Tucson, AZ (US); David L. Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 12/469,622

(22) Filed: May 20, 2009

(65) Prior Publication Data

US 2010/0299477 A1 Nov. 25, 2010

(51) Int. Cl.
*G06F 12/00* (2006.01)
(52) U.S. Cl. ........................... 711/111; 711/114
(58) Field of Classification Search ............ 711/111, 711/114
See application file for complete search history.

(56) References Cited

U.S. PATENT DOCUMENTS

| | | | | |
|---|---|---|---|---|
| 5,369,652 A * | 11/1994 | Bailey et al. | ................. | 714/755 |
| 6,222,698 B1 * | 4/2001 | Barndt et al. | ................. | 360/76 |
| 2002/0099906 A1 | 7/2002 | Chan et al. | ................. | 711/111 |
| 2005/0168865 A1 * | 8/2005 | Simmons et al. | ......... | 360/77.12 |
| 2005/0246510 A1 * | 11/2005 | Retnamma et al. | ........ | 711/162 |
| 2006/0039082 A1 | 2/2006 | Biskeborn et al. | ........ | 360/129 |
| 2007/0047122 A1 * | 3/2007 | Czarnecki et al. | ............ | 360/55 |
| 2007/0291595 A1 * | 12/2007 | Basham et al. | ............ | 369/30.01 |
| 2008/0024905 A1 | 1/2008 | Johnson et al. | ............ | 360/77.12 |
| 2009/0077310 A1 * | 3/2009 | Ashton et al. | ................. | 711/111 |
| 2009/0172322 A1 * | 7/2009 | Gilpin et al. | ................. | 711/162 |
| 2010/0049921 A1 * | 2/2010 | Aronovich et al. | .......... | 711/130 |

FOREIGN PATENT DOCUMENTS

| | | |
|---|---|---|
| EP | 1 174 795 | 1/2002 |
| GB | 2 396 739 | 6/2004 |
| WO | 2005/050383 | 6/2005 |

OTHER PUBLICATIONS

International Search Report and Written Opinion from PCT Application No. PCT/EP2010/053061 mailed on May 31, 2010.

* cited by examiner

*Primary Examiner* — Michael Tran
(74) *Attorney, Agent, or Firm* — Zilka-Kotab, PC (57) ABSTRACT

According to one embodiment, a method for storing data on a magnetic tape comprises receiving data from two different hosts and simultaneously writing the data from the hosts to the magnetic tape using multiple transducers. In another approach, a method for storing data on a magnetic tape comprises receiving requests to establish a concurrent reservation from multiple hosts and allocating a unique stripe in a wrap to each of the hosts that sent the requests, wherein the wrap is a collection of data tracks to be written simultaneously in one direction of tape movement by multiple transducers of a tape head, and the wrap is logically divided into the stripes. Also, the method includes receiving data from the hosts and simultaneously writing the data from the hosts to the magnetic tape using the multiple transducers. Other systems and methods concerning storing data on magnetic tapes are described as well.

24 Claims, 7 Drawing Sheets

MULTI-HOST CONCURRENT WRITING TO MAGNETIC TAPE

BACKGROUND

Driven by competition and customer demands, tape drive data rates have increased steadily while host data rates have increased at a much slower pace. Current tape drive data rates far exceed the rate at which most hosts can supply data to the tape drive system. This disparity hinders tape drive performance, leading to extended backup times and reduced efficiency.

Therefore, a solution that can address the shortcomings of current methodologies and systems to improve data storage rates and/or efficiency would be beneficial.

SUMMARY

According to one embodiment, a method for storing data on a magnetic tape comprises receiving data from two different hosts and simultaneously writing the data from the hosts to the magnetic tape using multiple transducers.

In another approach, a method for storing data on a magnetic tape comprises receiving requests to establish a concurrent reservation from multiple hosts and allocating a unique stripe in a wrap to each of the hosts that sent the requests. The wrap is a collection of data tracks to be written simultaneously in one direction of tape movement by multiple transducers of a tape head and is logically divided into the stripes. Also, the method includes receiving data from the hosts and simultaneously writing the data from the hosts to the magnetic tape using the multiple transducers.

In another embodiment, a system for storing data on a magnetic tape includes a magnetic head having multiple transducers, a drive mechanism for passing a magnetic tape over the head, and a controller in communication with the head. In addition, the system includes inputs for receiving data from two different hosts and logic for simultaneously writing the data from the hosts to the magnetic tape using the multiple transducers.

A magnetic tape cartridge according to another embodiment comprises a magnetic tape having stored thereon data that was received from two different hosts and written to the magnetic tape simultaneously.

A magnetic tape cartridge according to yet another embodiment comprises a magnetic tape being formatted for multiple-host concurrent writing, wherein the cartridge includes an indication that the tape is formatted for multiple-host concurrent writing.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Multi-Host Concurrent Writing allows two or more hosts to simultaneously write data to tape according to one approach, thereby leveraging the full potential of the tape drive. Multi-Host Concurrent Writing is a method by which two or more hosts can perform writes on a single tape drive at the same time. The tape drive manages the concurrency through a new tape format that divides each data wrap into two or more data "stripes." The volume of data transmitted from the two or more hosts working concurrently is more likely to approach the tape drive's native data rate, which allows the tape drive to approach peak performance.

In one general embodiment, a method for storing data on a magnetic tape comprises receiving data from two different hosts and simultaneously writing the data from the hosts to the magnetic tape using multiple transducers.

In another general embodiment, a method for storing data on a magnetic tape comprises receiving requests to establish a concurrent reservation from multiple hosts and allocating a unique stripe in a wrap to each of the hosts that sent the requests, wherein the wrap is a collection of data tracks to be written simultaneously in one direction of tape movement by multiple transducers of a tape head, wherein the wrap is logically divided into the stripes. The method also includes receiving data from the hosts and simultaneously writing the data from the hosts to the magnetic tape using the multiple transducers.

In another general embodiment, a system for storing data on a magnetic tape comprises a magnetic head having multiple transducers, a drive mechanism for passing a magnetic tape over the head, a controller in communication with the head, inputs for receiving data from two different hosts, and logic for simultaneously writing the data from the hosts to the magnetic tape using the multiple transducers.

In another general embodiment, a magnetic tape cartridge comprises a magnetic tape having stored thereon data that was received from two different hosts and written to the magnetic tape simultaneously.

Definitions

Wrap: a collection of simultaneously accessed tracks in one direction of tape travel.

Track: the data accessed by a single tape drive head read or write element.

Stripe: one portion of the tracks that comprise a wrap.

Backhitch: a mechanical reposition of the physical tape having a significant performance impact.

RABF: an acronym for Recursive Accumulating Backhitchless Flush. A previously patented method by which backhitches are reduced through temporarily relaxed dataset spacing.

Nonvolatile Caching: another term for RABF.

As will be appreciated by one skilled in the art, the present invention may be embodied as a system, method or computer program product. Accordingly, the present invention may take the form of an entirely hardware embodiment, a software embodiment (including firmware, resident software, microcode, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions rioted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
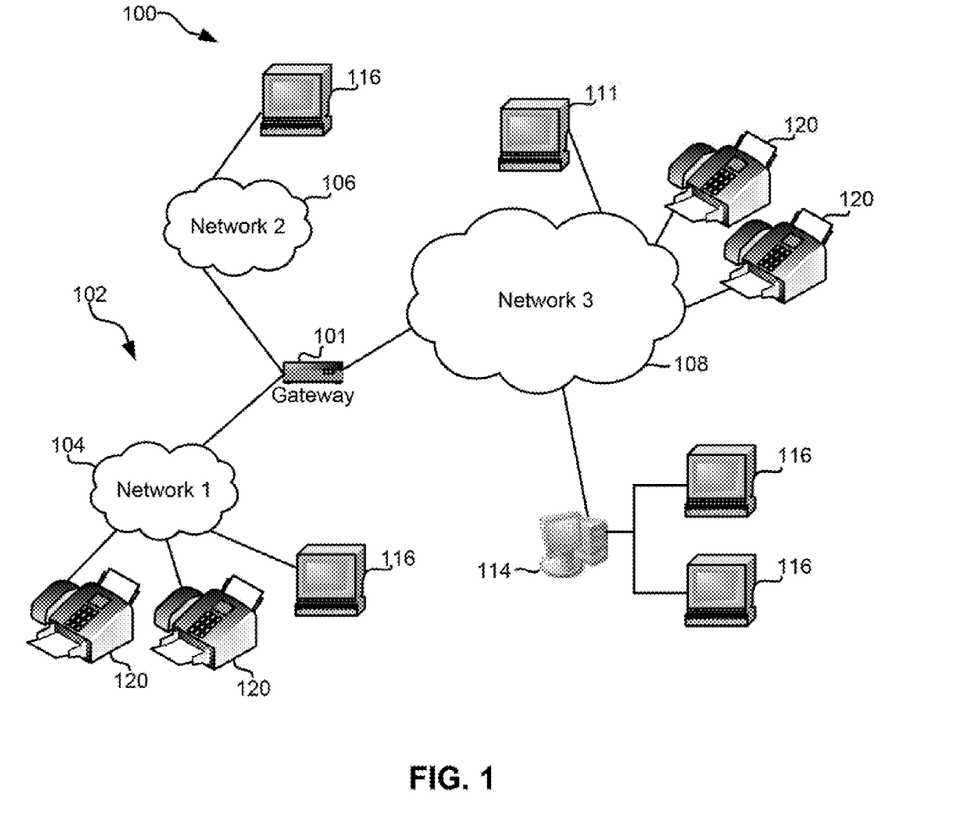
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet. 100421 Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2:
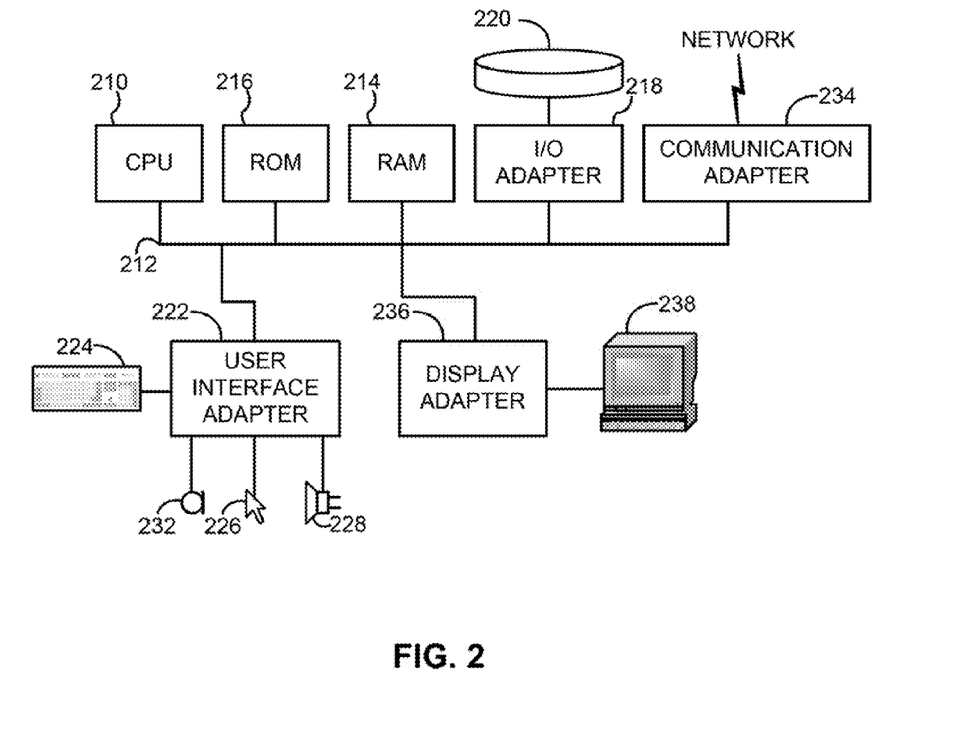
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

In existing tape formats, a single host, which may be any type of computing device or application, writes to the tape one wrap at a time. A wrap is a collection of related tracks that are written or read simultaneously by a tape drive head. A tape drive head has several read elements and write elements, which may be present on a single or multiple modules. A track is the data written by a single write element and read by a single read element. For example, a 16-channel head typically has 16 write elements and 16 read elements associated with each type of travel direction. During a write, the head may write 16 tracks in parallel. During a read, the head may read 16 tracks in parallel. The group of 16 simultaneously accessed tracks comprises a wrap.

Embodiments

Figure 3A:
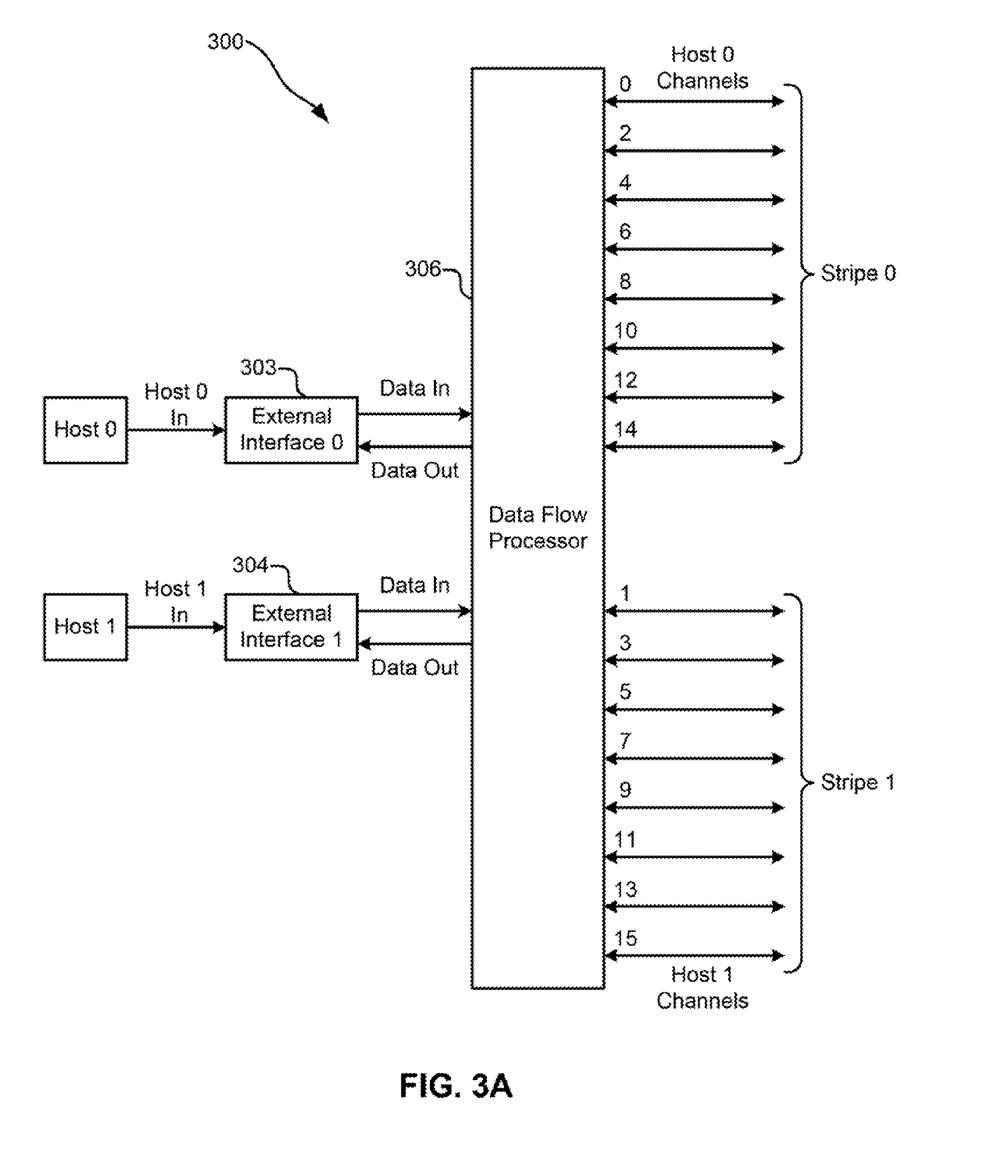
FIG. 3A depicts a simplified schematic diagram of a system for dual host concurrent writing, according to one embodiment.

Now referring to FIG. 3A, a system 300 for writing data from two hosts concurrently is shown, according to one embodiment. A "host" is hereby defined as any source of data, including but not limited to an independent computer, an application program, and combinations thereof. Accordingly, "hosts" may be individual computers; individual applications running on independent computers; individual applications running on the same computer but transferring data separately to the tape drive write circuitry, optionally each using different I/O circuitry; a single application running on one computer but transferring multiple streams of data individually to the tape drive write circuitry, optionally using different I/O circuitry for each stream; etc.

Of course, a similar system may be used to write data from more than two hosts by simply increasing the number of components to accommodate the extra hosts and data flow. However, for the sake of simplicity, this embodiment describes dual host writing. To properly perform dual host writing, a new tape format that can accept dual host writing has been developed. The tracks of a wrap may be logically divided into two stripes, Stripe 0 and Stripe 1. Each stripe may comprise a portion of the total tracks on the tape. For example, if the tape is written to 16 data tracks at a time, then the stripes may be separated, as shown in FIG. 3A, with 8 tracks written in Stripe 0 and 8 tracks written in Stripe 1. Of course, other separations are possible also, such as 4 tracks/12 tracks, 2 tracks/10 tracks, 6 tracks/10 tracks, etc. The wraps are essentially split longitudinally to define the stripes. Note that tracks in a given stripe may or may not be adjacent one another in a wrap. For example, as shown in FIG. 3A, the tracks may be present on the tape in numerical sequence, e.g., 0, 1, 2 . . . , 15, with a number of the tracks allocated to Stripe 0 and a number of the tracks allocated to Stripe 1. However, as shown, Stripe 0 in this example includes the even channels, e.g., 0, 2, 4 . . . , 14, and Stripe 1 includes the odd channels, e.g., 1, 3, 5 . . . , 15. Thus, at least one of the data tracks of Stripe 0 may lie on the magnetic tape between data tracks of Stripe 1. Each stripe may be allocated to one host, for example Stripe 0 may be dedicated to Host 0, and Stripe 1 may be dedicated to Host 1. The head may write data to both stripes simultaneously, allowing two hosts to write concurrently using a single head, thus performing dual host concurrent writing.

The tape itself may be formatted to accept multiple-host concurrent writing, e.g., for storing thereon data from two different hosts that is written to the magnetic tape simultaneously. Such formatting may include servo tracks on the magnetic tape defining data bands. Known formatting techniques and approaches may be used, such as but not limited to Linear Tape Open (LTO). Moreover, the cartridge may include an indication that the tape is formatted for multiple-host concurrent writing. In one approach, the indication may be written to the tape. In other approaches, the indication may be stored in a secondary nonvolatile memory (e.g., flash memory, EEPROM, etc.) coupled to the cartridge, etc.

Also shown in FIG. 3A, external interfaces 303, 304 may be used to receive data from the hosts, and then to provide the data to the data flow processor 306. These external interfaces 303, 304 may be present on the same chip as the data flow processor 306, or may be located elsewhere in the system 300. Also, how the tracks are split is not crucial, and the split of 8 tracks and 8 tracks, as shown in FIG. 3A, is not necessary. In addition, the choice of which tracks to allocate to which stripe is not crucial. For example only, the even channels have been designated to Stripe 0, and the even channels are designated to Stripe 1. In addition, there may be more than two stripes, according to some embodiments, which may be used to record data from more than two hosts.

In some embodiments, if a host is designated to participate in dual host writing, the host connects to the tape drive and establishes a "concurrent reservation." By establishing a concurrent reservation, the host indicates it intends to access (read and/or write) stripes, rather than the standard wraps, on the tape. Additionally, the host commits to sharing the tape drive's write processing resources with another host. A concurrent reservation allocates a specific stripe to each host. The host may track the stripe identifier it reserved in order to retrieve its data later.

Of course, in other embodiments, more than two hosts may write to a single tape, such as three hosts, four hosts, etc. In these embodiments, the number of hosts writing concurrently dictates how many stripes are defined on the tape.

Figure 3B:
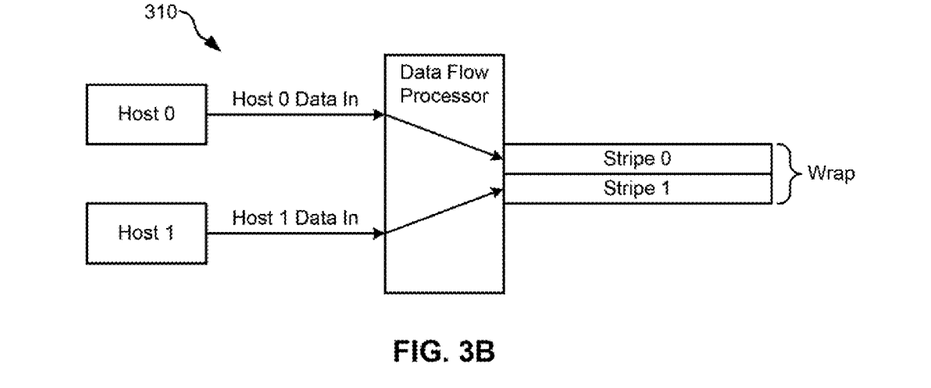
FIG. 3B shows a simplified overview of a system for dual host concurrent writing, according to one embodiment.

Now referring to FIG. 3B, a schematic overview of a system 310 for dual host concurrent writing is shown according to one embodiment. FIG. 3B shows how each host (Host 0, Host 1) is dedicated to one stripe of the tape (Stripe 0, Stripe 1). According to this embodiment, the data from Host 0 does not get transferred to Stripe 1, and vice versa. Also, the stripe length may be designated for an entire partition of the tape, for a wrap of the tape, etc. In some embodiments, the stripe size (e.g., number of tracks) may be changed when the stripe header is laid on the tape. For example, if Stripe 0 is 8 tracks and Stripe 1 is 8 tracks in partition 0 of a 16 track wrap, then a header may be laid on the tape indicating these sizes of the stripes. When data demands change from the hosts, such as Host 0 sending more data and Host 1 sending less data, then in partition 1 of the tape, a new header indicating that Stripe 0 is 12 tracks and Stripe 1 is 4 tracks may be made, thereby defining the size of the stripes in partition 1. This process may be repeated for each partition of the tape, for each wrap of the tape, etc., thereby indicating the amount of data written in each stripe based on the amount of data being received from the hosts.

According to some embodiments, a magnetic tape cartridge may comprise a magnetic tape having stored thereon data that was received from two different hosts and written to the magnetic tape simultaneously. Additionally, in some embodiments, the magnetic tape cartridge may further comprise a computer-readable indication that data from multiple hosts has been simultaneously written to the magnetic tape. Such indications may be written to the tape, stored in a memory or a nonvolatile memory not on the tape, such as on the cartridge, in a system, etc.

Figure 3C:
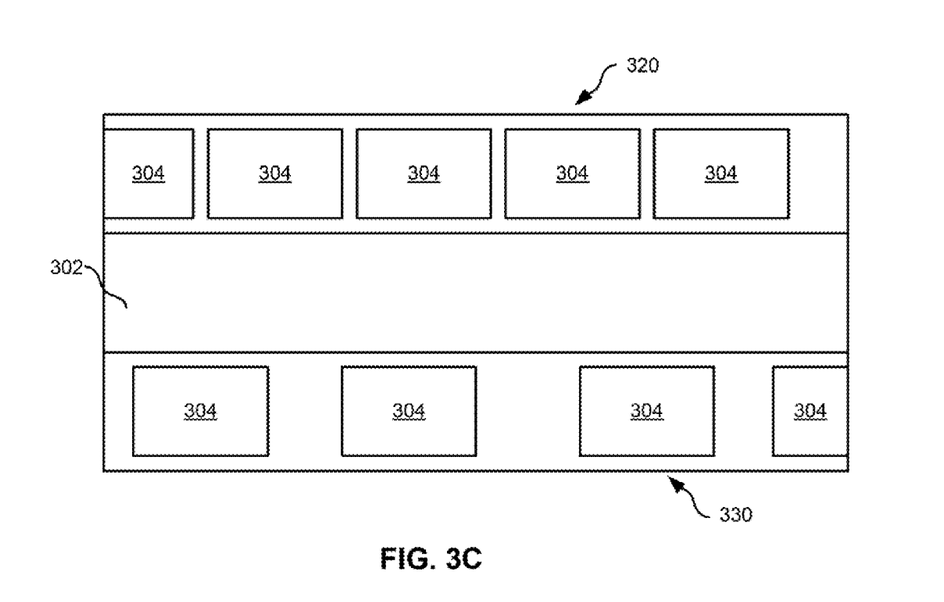
FIG. 3C shows a simplified schematic diagram of data written to two portions of a tape according to one embodiment.

Despite the fact that both hosts are unlikely to send data to the tape drive at exactly the same rate, the physical tape may advance at the same rate for both hosts. Referring to FIG. 3C, a simplified schematic diagram of data written to two tracks of a tape 302 is shown according to one embodiment. If the tape drive attempted to write datasets on tape 302 with uniform spacing for both hosts, the tape drive may be forced to mechanically reposition the tape 302, or backhitch, for the slower host. Frequent backhitches may degrade performance for the faster host. To avoid excessive backhitches and maintain optimum performance, the restrictions on dataset spacing may be relaxed, possibly resulting in optimum or near optimum dataset spacing in one portion 320 of the tape, and a more relaxed dataset spacing in another portion 330 of the tape. The capacity lost due to this loose dataset spacing could potentially be recouped through a modified version of RABF (a.k.a. Nonvolatile Caching). However, even with the loss of capacity, the gains from not performing backhitching is great, as the tape will last longer, the tape drive will perform better, etc.

Figure 4:
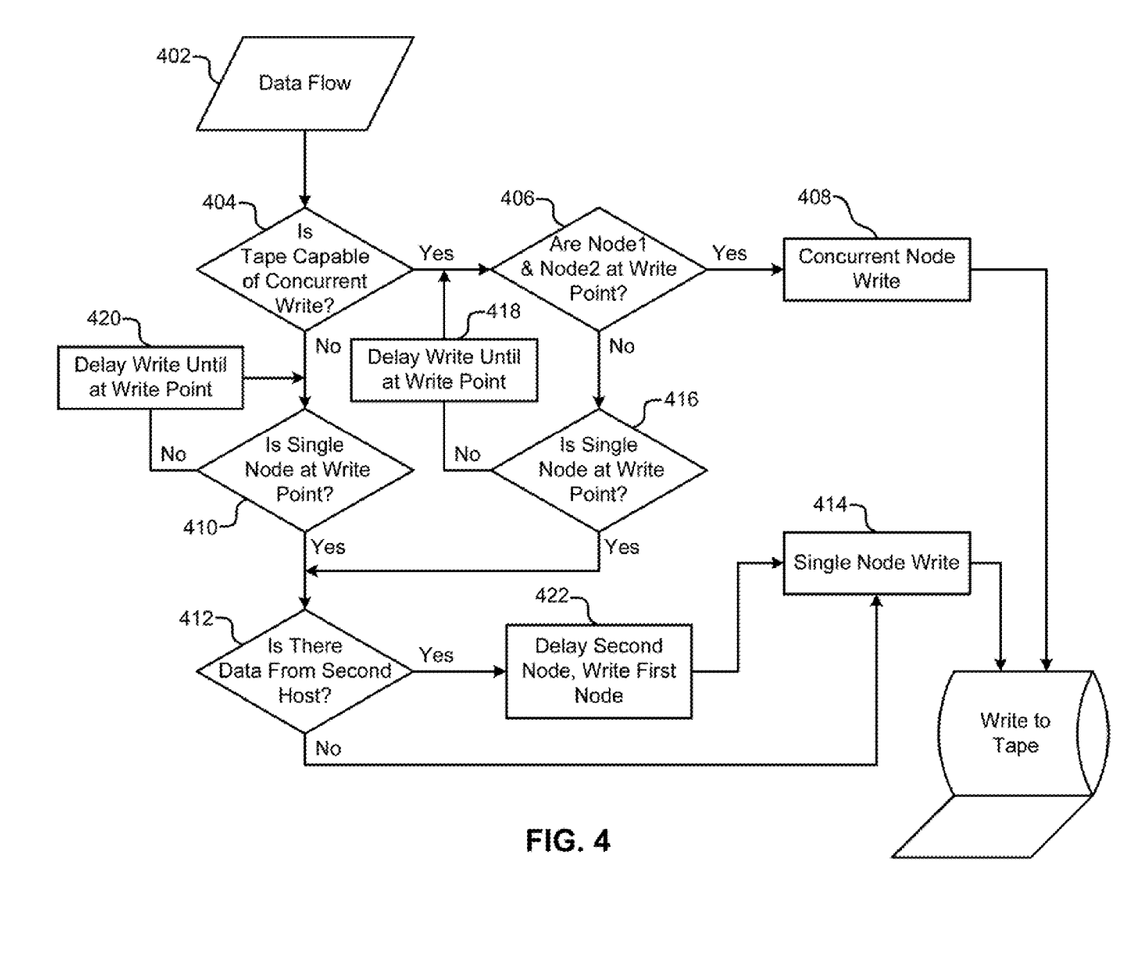
FIG. 4 is a flowchart showing a method for inputting data from one or more hosts to be written to a tape according to one embodiment.

Now referring to FIG. 4, data flow for node and stripe concurrence is shown according to one embodiment, relying on dual host writing, but can be expanded to accommodate more than two hosts by increasing the number of steps to accommodate all decision making for multiple hosts. Data flow in step 402, from one or more hosts, and possibly provided by one or more external interfaces, may be received by a tape system. It is assumed for this example that none, one or two hosts may send information to the tape system. In step 404, it is determined whether the tape in the tape system is capable of dual host concurrent writing, e.g., the tape is formatted for dual head concurrent writing. If so, in step 406, it is determined whether the tape is at a point where data from both hosts may be written to the tape, as indicated by Node1 and Node2 being at a write point. If the tape is at such a write point, then in step 408, data from both hosts are written concurrently to the tape.

If the tape is not capable of concurrent writing in step 404, then in step 410, it is determined if the tape is at a write point for one of the host data streams, as indicated by a single node (Node1 or Node2) being at a write point. If the tape is not at a write point for one of the host data streams, then in step 420, writing is delayed until the tape is at a write point for one of the host data streams, and the process continues back to step 410. If the tape is at a write point for one of the hosts' data streams, then it is determined if there is data from the other host, in step 412. If there is no data coming from the second host, then in step 414, data from a single host is written to the tape. If there is data from the second host, as determined in step 412, then in step 422, the data from the second host is delayed, allowing the data from the first host to be written, continuing on to step 414 for single host writing.

If the tape is not a write point where data from both hosts may be written to the tape, as determined in step 406, then it is determined if the tape is at a write point for one of the host data streams in step 416, as indicated by a single node (Node1 or Node2) being at a write point. If so, then the process continues to step 412. If not, then in step 418 writing may be delayed until at least one data stream may be written, and the process continues to step 406.

Note that non-concurrent writing is also enabled, such as when one stripe has been previously written to a tape formatted for concurrent write, and it is later desired to write to another stripe. Accordingly, at step 404, it is determined that the tape is capable of concurrent write, but in step 406, it is determined that both nodes are not at a write point. In step 416, it is determined when one of the nodes is at the proper write point, e.g., the beginning of the unwritten stripe or stripe to be overwritten. The process continues through steps 412, 422 and 414 for writing to that stripe in a single node write mode.

The process described above is presented by way of example only, and is not meant to be limiting on how the flow of data may be interpreted to determine whether concurrent or single host writing should be performed. Many other methods may be used to determine how and when data should be written to the tape using the methods and techniques described herein. Thus, the scope of the invention is limited by the claims only.

Figure 5:
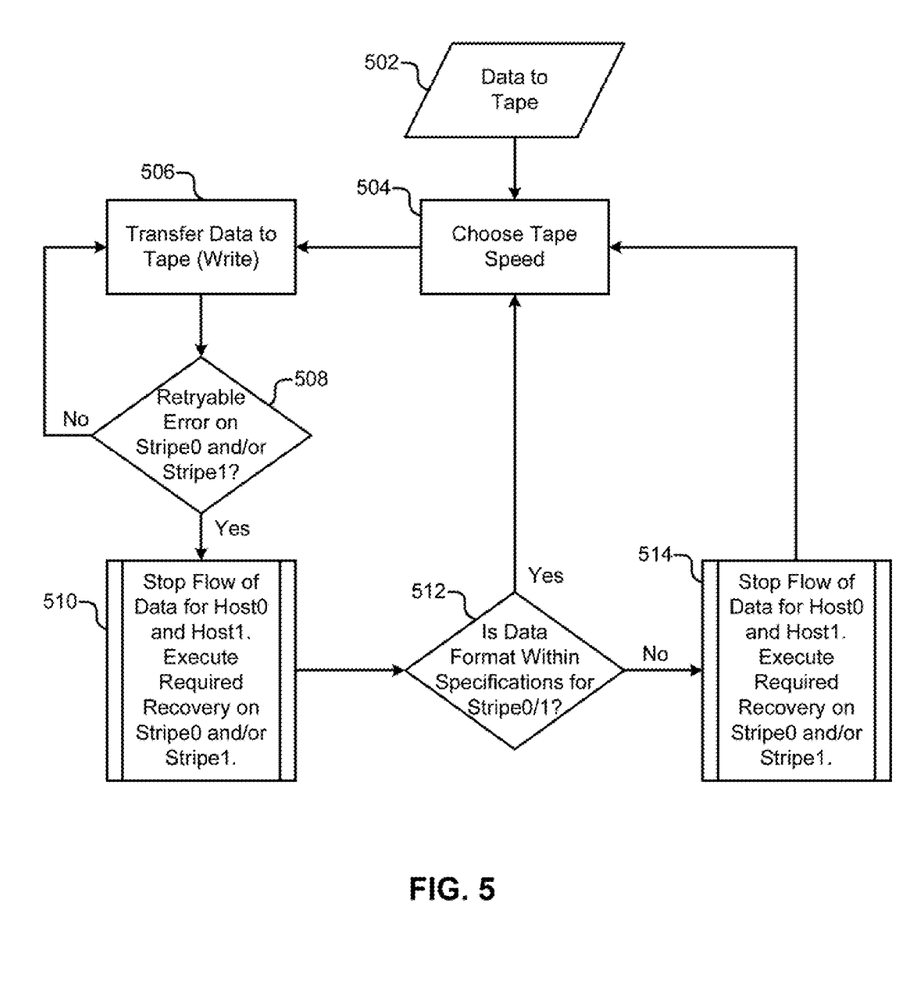
FIG. 5 is a flowchart showing a method for writing data from one or more hosts to a tape according to one embodiment.

With reference to FIG. 5, a schematic diagram showing data flow to the tape according to one embodiment, a redundant checking principle is shown. Step 502 may be a continuation from FIG. 4, where data is written to the tape from either a single host or concurrently. If data is written from a single host, the speed of the tape typically is determined by the rate of data flowing from the single host. However, if data is being written concurrently, the speed of the tape may be determined, in step 504, in a number of ways. In one embodiment, the speed of the tape is chosen to correspond to the data rate of the slower of the two hosts, thus causing the data from the faster host to be backed up in a buffer. According to another embodiment, the speed of the tape may be chosen to correspond to the data rate of the faster host, thus resulting in larger dataset spacing on the stripe recording the data from the slower host. In other embodiments, a speed of the tape may fall somewhere between these two previously described values, such as an average of speeds that correspond to the data rate from the slower and faster host, a multiple of the speed of the tape that corresponds to the data rate of the slower host, a faction of the speed of the tape that corresponds to the data rate of the faster host, etc.

In step 506, data is transferred to the tape (written to the tape). This can be either concurrent dual-host writing, or single host writing. In step 508, it is determined if there is retryable error on one of the stripes, either Stripe0 and/or Stripe1. If there is no error on the tape, then writing continues in step 506. If an error is detected, in step 508, then the flow of data is stopped for both data streams, and the required recovery on the erroneously written data is performed on the affected stripe, either Stripe0 and/or Stripe1, in step 510.

Then, in step 512, it is determined if the data written is within the format specifications for the data stream onto Stripe0 and/or Stripe1. If so, then the process continues to step 504, as the data has been written properly. If not, then the process goes to step 514, where the data flow for both hosts is stopped, and recovery is performed on the affected, out-of-specification written data stripe, Stripe0 and/or Stripe1. Once the data has been recovered in step 514, the process proceeds to step 504 as the data has been recorded properly.

The processes described in relation to FIG. 5 are for explanatory purposes only, and are not meant to be limiting in any way. Any process or technique may be used to determine tape speed, and to check for errors in writing the data, singularly or concurrently, to the tape, and are not limited by these descriptions, but only by the claims.

Figure 6:
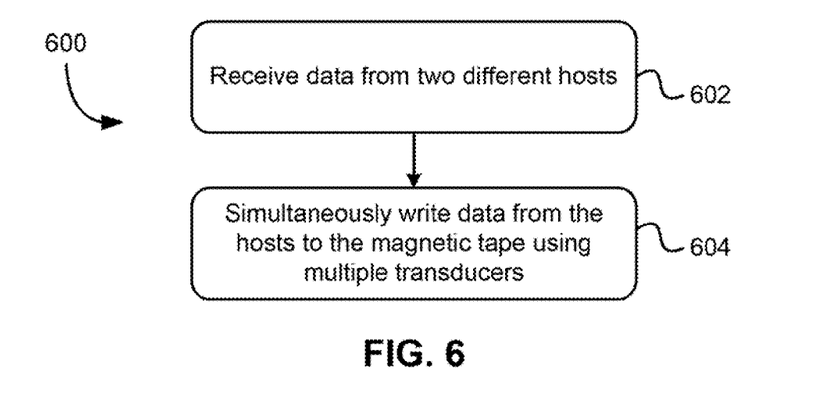
FIG. 6 is a flowchart of a method for storing data on a magnetic tape according to one embodiment.

Now referring to FIG. 6, a flowchart of a method 600 for storing data on a magnetic tape is shown according to one embodiment. Method 600 may be carried out in any desired environment, including in computer systems, controllers for tape heads, etc. Also, method 600 may include additional, heretofore undescribed steps, processes, and/or operations. In addition, embodiments described in reference to other figures and/or methods may also be applied to the description of method 600 when logically congruent.

In operation 602, data from two different hosts is received where a host is any device capable of transferring data, and may be local (e.g., directly connected to the drive) or remote (e.g., connected to the drive via a network link).

In operation 604, the data from the hosts is simultaneously written to the magnetic tape using multiple transducers. Of course, if there is no data from one of the hosts to be written at any given time, then only data from the other host may be written. However, by simultaneously writing data from the hosts, it is intended that both hosts have data to be written, but when one of the hosts does not have data to be written, only data from the host that does have data to be written, is in fact written.

According to some embodiments, the method 600 may include storing an indication that data from multiple hosts has been simultaneously written to the magnetic tape. This indication may be stored on the tape itself, in a secondary memory of the tape cartridge, in a tape library, in a database having information about the tape cartridge, etc.

In some approaches, data may be received from each of the hosts at a respective incoming data rate, and the method may further comprise selecting a data write rate that about matches or corresponds to a faster of the incoming data rates from the hosts. In further approaches, a dataset spacing of the data corresponding to the host having a slower of the incoming data rates may be relaxed. This may be similar to the tape speed description in relation to step 504 in FIG. 5, above.

In more embodiments, data may be received from each of the hosts at a respective incoming data rate, and further comprising selecting a data write rate that about matches a slower of the incoming data rates from the hosts. In further embodiments, a temporary suspension of data transfer from the host having the faster of the incoming data rates may be requested e.g., for preventing a buffer overrun.

According to some approaches, data may be received from each of the hosts at a respective incoming data rate, and the method 600 in FIG. 6 may further comprise selecting a data write rate that is between a faster and a slower of the incoming data rates from the hosts. In further approaches, a dataset spacing of the data corresponding to the host having a slower of the incoming data rates may be relaxed. This may be similar to the tape speed description in relation to step 504 in FIG. 5, above.

Also, a collection of data tracks written simultaneously in one direction of tape movement by the multiple transducers may be a wrap according to some embodiments. The wrap may be logically divided into two stripes, with each stripe being allocated to one of the hosts, and each stripe being associated with a plurality of the transducers. In addition, the data corresponding to each host may be simultaneously written to the stripe allocated to each respective host. In further embodiments, the method 600 in FIG. 6 may include receiving a request to establish a concurrent reservation from one of the hosts, and the method 600 may further comprise allocating one of the stripes in the wrap to the host that sent the request.

The method 600 may also include storing an indication that data from multiple hosts has been simultaneously written to the magnetic tape. Data may be received from each of the hosts at a respective incoming data rate, and the method 600 may further comprise selecting a data write rate based on the incoming data rates from the hosts, wherein a collection of data tracks written simultaneously in one direction of tape movement by the multiple transducers may be a wrap. Also, the wrap may be logically divided into two stripes, with each stripe being allocated to one of the hosts, and each stripe being associated with a plurality of the transducers. In addition, the data corresponding to each host may be simultaneously written to the stripe allocated to each respective host.

Figure 7:
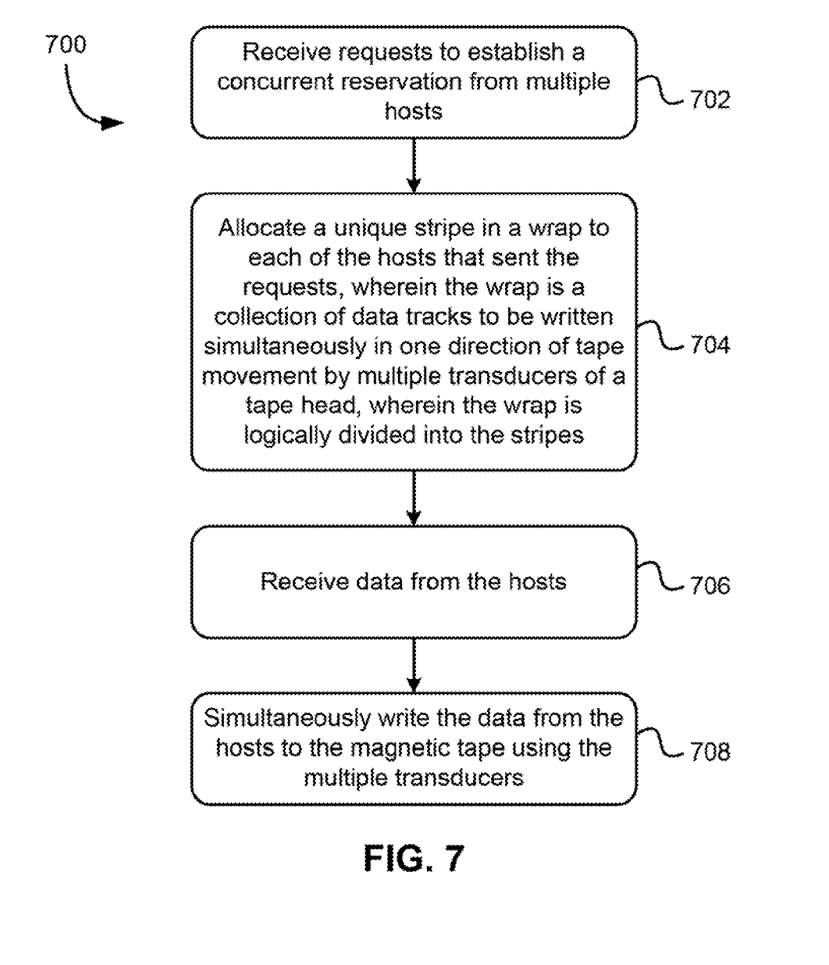
FIG. 7 is a flowchart of a method for storing data on a magnetic tape according to one embodiment.

Now referring to FIG. 7, a flowchart of a method 700 for storing data on a magnetic tape is shown according to one embodiment. Method 700 may be carried out in any desired environment, including in computer systems, controllers for tape heads, etc. Also, method 700 may include additional, heretofore undescribed steps, processes, and/or operations. In addition, embodiments described in reference to other figures and/or methods may also be applied to the description of method 700 when logically congruent.

In operation 702, requests to establish a concurrent reservation from multiple hosts may be received.

In operation 704, a unique stripe in a wrap may be allocated to each of the hosts that sent the requests. The wrap may be a collection of data tracks to be written simultaneously in one direction of tape movement by multiple transducers of a tape head, and the wrap may be logically divided into the stripes.

In operation 706, data may be received from the hosts. The data may be sent directly from the hosts, may be sent to one or more external interfaces, etc.

In operation 708, the data from the hosts may be simultaneously written to the magnetic tape using the multiple transducers. As previously described, if one of the hosts does not have data to be written at any given time, or is operating at such a slower rate that the faster host information is coming fast enough, the data from the faster host may be written while data from the slower host is not written.

According to some embodiments, a system for storing data on a magnetic tape may include a magnetic head having multiple transducers, a drive mechanism for passing a magnetic tape over the head, a controller in communication with the head, inputs for receiving data from two different hosts, and logic for simultaneously writing the data from the hosts to the magnetic tape using the multiple transducers. The system may include some of the functionality and/or processes described in relation to FIGS. 3A-5.

In some embodiments, the system may further comprise logic for storing an indication that data from multiple hosts has been simultaneously written to the magnetic tape. This indication may be stored on the tape itself, in a secondary memory of the tape cartridge, etc.

In some approaches, data may be received from each of the hosts at a respective incoming data rate, and the system may further comprise logic for selecting a data write rate that about matches a faster of the incoming data rates from the hosts. In further approaches, a dataset spacing of the data corresponding to the host having a slower of the incoming data rates may be relaxed. This may be similar to the tape speed description in relation to step 504 in FIG. 5, above.

In some embodiments, data may be received from each of the hosts at a respective incoming data rate, and the system may further comprise logic for selecting a data write rate that about matches or corresponds to a slower of the incoming data rates from the hosts. In further embodiments, a temporary suspension of data transfer may be requested from the host having the faster of the incoming data rates.

According to some approaches, data may be received from each of the hosts at a respective incoming data rate, and the system may further comprise logic for selecting a data write rate that is between a faster and a slower of the incoming data rates from the hosts. In further approaches, a dataset spacing of the data corresponding to the host having a slower of the incoming data rates may be relaxed. This may be similar to the tape speed description in relation to step 504 in FIG. 5, above.

In some embodiments, a collection of data tracks written simultaneously in one direction of tape movement by the multiple transducers may be a wrap. The wrap may be logically divided into two stripes, with each stripe being allocated to one of the hosts, and each stripe being associated with a plurality of the transducers. Also, the data corresponding to each host may be simultaneously written to the stripes allocated to each respective host. In further embodiments, the system may further comprise receiving a request to establish a concurrent reservation from one of the hosts, and may further include allocating one of the stripes in the wrap to the host that sent the request.

According to some approaches, the system may further comprise logic for storing an indication that data from multiple hosts has been simultaneously written to the magnetic tape, wherein data may be received from each of the hosts at a respective incoming data rate. Also, the system may further include logic for selecting a data write rate based on the incoming data rates from the hosts, wherein a collection of data tracks written simultaneously in one direction of tape movement by the multiple transducers may be a wrap. The wrap may be logically divided into two stripes, with each stripe being allocated to one of the hosts, and each stripe being associated with a plurality of the transducers. The data corresponding to each host may be simultaneously written to the stripe allocated to each respective host.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for storing data on a magnetic tape, the method comprising: receiving data from two different hosts; and simultaneously writing the data from the hosts to the magnetic tape using multiple transducers, wherein data is received from each of the hosts at a respective incoming data rate, and further comprising selecting a data write rate that about matches a faster of the incoming data rates from the hosts.

2. The method as recited in claim 1, further comprising storing an indication that data from multiple hosts has been simultaneously written to the magnetic tape.

3. The method as recited in claim 1, wherein a dataset spacing of the data corresponding to the host having a slower of the incoming data rates is relaxed.

4. A method for storing data on a magnetic tape, the method comprising: receiving data from two different hosts; and simultaneously writing the data from the hosts to the magnetic tape using multiple transducers, wherein data is received from each of the hosts at a respective incoming data rate, and further comprising selecting a data write rate that about matches a slower of the incoming data rates from the hosts.

5. The method as recited in claim 4, further comprising requesting a temporary suspension of data transfer from the host having the faster of the incoming data rates.

6. A method for storing data on a magnetic tape, the method comprising: receiving data from two different hosts; and simultaneously writing the data from the hosts to the magnetic tape using multiple transducers, wherein data is received from each of the hosts at a respective incoming data rate, and further comprising selecting a data write rate that is between a faster and a slower of the incoming data rates from the hosts.

7. The method as recited in claim 6, wherein a dataset spacing of the data corresponding to the host having a slower of the incoming data rates is relaxed.

8. A method for storing data on a magnetic tape, the method comprising: receiving data from two different hosts; and simultaneously writing the data from the hosts to the magnetic tape using multiple transducers, wherein a collection of data tracks written simultaneously in one direction of tape movement by the multiple transducers is a wrap, wherein the wrap is logically divided into two stripes, each stripe being allocated to one of the hosts, each stripe being associated with a plurality of the transducers, wherein the data corresponding to each host is simultaneously written to the stripe allocated to each respective host.

9. The method as recited in claim 8, further comprising receiving a request to establish a concurrent reservation from one of the hosts, and further comprising allocating one of the stripes in the wrap to the host that sent the request.

10. A method for storing data on a magnetic tape the method comprising: receiving data from two different hosts; simultaneously writing the data from the hosts to the magnetic tape using multiple transducers; storing an indication that data from multiple hosts has been simultaneously written to the magnetic tape, wherein data is received from each of the hosts at a respective incoming data rate, and further comprising selecting a data write rate based on the incoming data rates from the hosts, wherein a collection of data tracks written simultaneously in one direction of tape movement by the multiple transducers is a wrap, wherein the wrap is logically divided into two stripes, each stripe being allocated to one of the hosts, each stripe being associated with a plurality of the transducers, wherein the data corresponding to each host is simultaneously written to the stripe allocated to each respective host.

11. A method for storing data on a magnetic tape, the method comprising:
receiving requests to establish a concurrent reservation from multiple hosts;

allocating a unique stripe in a wrap to each of the hosts that sent the requests,
    wherein the wrap is a collection of data tracks to be written simultaneously in one direction of tape movement by multiple transducers of a tape head, wherein the wrap is logically divided into the stripes;
receiving data from the hosts; and
simultaneously writing the data from the hosts to the magnetic tape using the multiple transducers.

12. A system for storing data on a magnetic tape, the system comprising: a magnetic head having multiple transducers;
    a drive mechanism for passing a magnetic tape over the head;
    a controller in communication with the head;
    inputs for receiving data from two different hosts; and
    logic for simultaneously writing the data from the hosts to the magnetic tape using the multiple transducers,
    wherein data is received from each of the hosts at a respective incoming data rate, and further comprising logic for selecting a data write rate that about matches a faster of the incoming data rates from the hosts.

13. The system as recited in claim 12, wherein a dataset spacing of the data corresponding to the host having a slower of the incoming data rates is relaxed.

14. A system for storing data on a magnetic tape, the system comprising: a magnetic head having multiple transducers;
    a drive mechanism for passing a magnetic tape over the head;
    a controller in communication with the head;
    inputs for receiving data from two different hosts; and
    logic for simultaneously writing the data from the hosts to the magnetic tape using the multiple transducers,
    wherein data is received from each of the hots at a respective incoming data rate, and further comprising logic for selecting a data write rate that about matches a slower of the incoming data rates from the hosts.

15. The system as recited in claim 14, further comprising logic for storing an indication that data from multiple hosts has been simultaneously written to the magnetic tape.

16. The system as recited in claim 14, wherein a temporary suspension of data transfer is requested from the host having the faster of the incoming data rates.

17. A system for storing data on a magnetic tape, the system comprising: a magnetic head having multiple transducers;
    a drive mechanism for passing a magnetic tape over the head;
    a controller in communication with the head;
    inputs for receiving data from two different hosts; and
    logic for simultaneously writing the data from the hosts to the magnetic tape using the multiple transducers,
    wherein data is received from each of the hosts at a respective incoming data rate, and further comprising logic for selecting a data write rate that is between a faster and a slower of the incoming data rates from the hosts.

18. The system as recited in claim 17, wherein a dataset spacing of the data corresponding to the host having a slower of the incoming data rates is relaxed.

19. A system for storing data on a magnetic tape, the system comprising: a magnetic head having multiple transducers;
    a drive mechanism for passing a magnetic tape over the head;
    a controller in communication with the head;
    inputs for receiving data from two different hosts; and
    logic for simultaneously writing the data from the hosts to the magnetic tape using the multiple transducers,
    wherein a collection of data tracks written simultaneously in one direction of tape movement by the multiple transducers is a wrap, wherein the wrap is logically divided into two stripes, each stripe being allocated to one of the hosts, each stripe being associated with a plurality of the transducers, wherein the data corresponding to each host is simultaneously written to the stripes allocated to each respective host.

20. The system as recited in claim 19, further comprising receiving a request to establish a concurrent reservation from one of the hosts, and further comprising allocating one of the stripes in the wrap to the host that sent the request.

21. A system for storing data on a magnetic tape, the system comprising: a magnetic head having multiple transducers;
    a drive mechanism for passing a magnetic tape over the head;
    a controller in communication with the head;
    inputs for receiving data from two different hosts;
    logic for simultaneously writing the data from the hosts to the magnetic tape using the multiple transducers; and
    logic for storing an indication that data from multiple hosts has been simultaneously written to the magnetic tape, wherein data is received from each of the hosts at a respective incoming data rate, and further comprising logic for selecting a data write rate based on the incoming data rates from the hosts, wherein a collection of data tracks written simultaneously in one direction of tape movement by the multiple transducers is a wrap, wherein the wrap is logically divided into two stripes, each stripe being allocated to one of the hosts, each stripe being associated with a plurality of the transducers, wherein the data corresponding to each host is simultaneously written to the stripe allocated to each respective host.

22. A magnetic tape cartridge comprising a magnetic tape having stored thereon data that was received from two different hosts and written to the magnetic tape simultaneously, wherein the data from the two different hosts is present on the magnetic tape in stripes, wherein each stripe includes multiple, simultaneously-written data tracks.

23. The magnetic tape cartridge as recited in claim 22, further comprising a computer-readable indication that data from multiple hosts has been simultaneously written to the magnetic tape.

24. The magnetic tape cartridge as recited in claim 22, wherein at least one of the data tracks of a first of the stripes lies on the magnetic tape between data tracks of a second of the stripes written concurrently therewith.

* * * * *